(12) United States Patent
Weidenbacher

(10) Patent No.: US 11,339,603 B2
(45) Date of Patent: May 24, 2022

(54) METHOD FOR ACTUATING A MOTOR-DRIVEN CLOSURE ELEMENT ASSEMBLY OF A MOTOR VEHICLE

(71) Applicant: Brose Fahrzeugteile GmbH & Co. Kommanditgesellschaft, Bamberg, Bamberg (DE)

(72) Inventor: Christian Weidenbacher, Donnersdorf (DE)

(73) Assignee: Brose Fahrzeugteile GmbH SE & Co. Kommanditgesellschaft, Bamberg, Bamberg (DE)

( * ) Notice: Subject to any disclaimer, the term of this patent is extended or adjusted under 35 U.S.C. 154(b) by 60 days.

(21) Appl. No.: 16/468,993

(22) PCT Filed: Dec. 12, 2017

(86) PCT No.: PCT/EP2017/082315
§ 371 (c)(1),
(2) Date: Jun. 12, 2019

(87) PCT Pub. No.: WO2018/108858
PCT Pub. Date: Jun. 21, 2018

(65) Prior Publication Data
US 2019/0309565 A1    Oct. 10, 2019

(30) Foreign Application Priority Data

Dec. 13, 2016 (DE) ............ 10 2016 124 275.6

(51) Int. Cl.
*E06B 3/00* (2006.01)
*E05F 15/73* (2015.01)
(Continued)

(52) U.S. Cl.
CPC ............ *E05F 15/73* (2015.01); *E05F 15/76* (2015.01); *E05F 15/77* (2015.01);
(Continued)

(58) Field of Classification Search
CPC .......... E05F 15/73; E05F 15/76; E05F 15/77; B60R 25/2054; B60R 25/24;
(Continued)

(56) References Cited

U.S. PATENT DOCUMENTS 9,463,776 B2    10/2016    Gunreben
9,580,046 B2    2/2017    Luu et al.
(Continued)

FOREIGN PATENT DOCUMENTS

DE    102006037237    2/2008
DE    102008014520    11/2008
(Continued)

OTHER PUBLICATIONS

Chinese Search Report for Chinese Patent Application No. 201780077129.4 dated May 13, 2020 (3 pages) English Translation Only.
(Continued)

*Primary Examiner* — Jerry E Redman
(74) *Attorney, Agent, or Firm* — Pauly, DeVries Smith & Deffner LLC

(57) ABSTRACT

A method for actuating a motorized closure element arrangement of a motor vehicle, wherein the closure element arrangement comprises a closure element, a control arrangement and a sensor arrangement, wherein the sensor measurement values of the sensor arrangement are monitored by the control arrangement as to whether a triggering operating situation exists, which is defined by at least one operating situation condition, and wherein when the triggering operating situation is detected by the control arrangement actuation of the closure element arrangement is triggered. It is proposed that a portable haptic transducer is provided and that in at least one predetermined trigger state of the control
(Continued)

arrangement haptic information associated with the trigger state is output by the transducer.

17 Claims, 2 Drawing Sheets

(51) Int. Cl.
  *E05F 15/76* (2015.01)
  *E05F 15/77* (2015.01)
  *B60R 25/20* (2013.01)
  *B60R 25/24* (2013.01)
(52) U.S. Cl.
  CPC ........... *B60R 25/2054* (2013.01); *B60R 25/24* (2013.01); *E05Y 2400/858* (2013.01); *E05Y 2900/546* (2013.01); *E05Y 2900/548* (2013.01)
(58) Field of Classification Search
  CPC ......... E05Y 2400/858; E05Y 2900/546; E05Y 2900/548
  USPC ...................................................... 49/25, 506
  See application file for complete search history.

(56) References Cited

U.S. PATENT DOCUMENTS

| | | | |
|---|---|---|---|
| 9,764,713 | B2 | 9/2017 | Siswick et al. |
| 10,178,890 | B1* | 1/2019 | Andon .................. G01S 5/0027 |
| 10,354,652 | B2* | 7/2019 | Huang .................... G10L 15/16 |
| 10,667,051 | B2* | 5/2020 | Stahl ..................... H04R 29/001 |
| 10,726,683 | B1* | 7/2020 | Marchais .................. B06B 1/04 |
| 10,848,886 | B2* | 11/2020 | Rand ................ G11B 20/10527 |
| 10,852,830 | B2* | 12/2020 | Gordon .................. B06B 1/045 |
| 10,860,202 | B2* | 12/2020 | Sepehr .................. G06F 3/0412 |
| 2006/0049920 | A1* | 3/2006 | Sadler .................... G06F 1/1626 340/407.1 |
| 2006/0244312 | A1 | 11/2006 | Ogino et al. |
| 2012/0126959 | A1* | 5/2012 | Zarrabi ................. H01L 41/293 340/407.1 |
| 2013/0151084 | A1 | 6/2013 | Lee |
| 2014/0347176 | A1* | 11/2014 | Modarres ................ G06F 3/016 340/407.1 |
| 2015/0077324 | A1* | 3/2015 | Birnbaum ............... G06F 3/016 345/156 |
| 2015/0087935 | A1* | 3/2015 | Davis ...................... A61B 5/445 600/309 |
| 2015/0323993 | A1* | 11/2015 | Levesque ........... G02B 27/0172 345/156 |
| 2016/0180661 | A1* | 6/2016 | Ullrich ..................... G08B 6/00 340/407.1 |
| 2016/0189494 | A1* | 6/2016 | Levesque ............. A61B 5/7455 340/407.1 |
| 2017/0076361 | A1* | 3/2017 | Levesque .......... G06Q 30/0639 |
| 2017/0118178 | A1 | 4/2017 | Fruehling et al. |
| 2017/0228935 | A1* | 8/2017 | Foster .................... G06F 1/1694 |
| 2017/0340254 | A1* | 11/2017 | Davis ................ A61B 5/02042 |
| 2017/0351098 | A1* | 12/2017 | Osterhout ............. G06F 1/1632 |
| 2018/0321748 | A1* | 11/2018 | Rao ........................ G06F 3/0416 |
| 2018/0364697 | A1* | 12/2018 | Elangovan ........... G05D 1/0016 |
| 2019/0009097 | A1* | 1/2019 | Hartley ................... H02J 50/12 |
| 2019/0011988 | A1* | 1/2019 | Khosh ................. G06F 3/04164 |
| 2019/0049262 | A1* | 2/2019 | Grimm .................. G07C 5/008 |
| 2019/0056440 | A1* | 2/2019 | Vellanki ............... H04R 29/001 |
| 2019/0227628 | A1* | 7/2019 | Rand ....................... G06F 3/167 |
| 2019/0311590 | A1* | 10/2019 | Doy ........................ G06F 3/016 |
| 2020/0026354 | A1* | 1/2020 | Swindells ............... G06F 3/016 |
| 2020/0211337 | A1* | 7/2020 | Grant ...................... G06F 3/016 |
| 2020/0257284 | A1* | 8/2020 | Hassani ............. G06F 3/04886 |
| 2020/0294472 | A1* | 9/2020 | Jones ....................... H04B 7/26 |
| 2020/0309611 | A1* | 10/2020 | Marchais ................ G01L 1/086 |
| 2020/0313529 | A1* | 10/2020 | Lindemann ........... H03F 1/0211 |
| 2020/0313654 | A1* | 10/2020 | Marchais ............... G01H 15/00 |
| 2020/0342724 | A1* | 10/2020 | Marchais ................ G08B 6/00 |
| 2020/0371592 | A1* | 11/2020 | Melanson ............... G06F 3/016 |
| 2020/0387157 | A1* | 12/2020 | Bosma .................. G05D 1/0276 |
| 2020/0387225 | A1* | 12/2020 | Das ........................ G06F 3/016 |
| 2020/0396538 | A1* | 12/2020 | Chang ..................... H04R 3/04 |
| 2020/0403546 | A1* | 12/2020 | Janko ...................... G08B 6/00 |

FOREIGN PATENT DOCUMENTS

| | | | |
|---|---|---|---|
| DE | 102014101661 | | 8/2015 |
| DE | 102015214794 | | 2/2017 |
| DE | 102016124275 A1 * | 6/2018 | ............. E05F 15/76 |
| JP | 2014177188 W | | 9/2014 |
| JP | 2016160732 | | 9/2016 |
| WO | 2011026763 | | 3/2011 |
| WO | 2014064297 | | 5/2014 |
| WO | 2018108858 | | 6/2018 |

OTHER PUBLICATIONS

Office Action for Korean Patent Application No. 10-2019-7020444 dated Jul. 14, 2020 (4 pages) No English Translation.
"German Search Report," for German Patent Application No. 102016124275.6 dated Jul. 17, 2017 (8 pages).
"International Search Report and Written Opinion," for PCT Application No. PCT/EP2017/082315 dated Jun. 6, 2018 (15 pages).

* cited by examiner

METHOD FOR ACTUATING A MOTOR-DRIVEN CLOSURE ELEMENT ASSEMBLY OF A MOTOR VEHICLE

CROSS-REFERENCE TO RELATED APPLICATIONS

This application is a national stage application under 35 U.S.C. 371 of International Patent Application Serial No. PCT/EP2017/082315, entitled "Method for Actuating a Motor-Driven Closure Element Assembly of a Motor Vehicle," filed Dec. 12, 2017, which claims priority from German Patent Application No. DE 10 2016 124 275.6, filed Dec. 13, 2016, the disclosure of which is incorporated herein by reference.

FIELD OF THE TECHNOLOGY

The disclosure concerns a method for actuating a motorized closure element arrangement of a motor vehicle and a control system for a motorized closure element arrangement of a motor vehicle.

BACKGROUND

Motorized closure element arrangements have been largely accepted in recent years as part of the increase in comfort in motor vehicles. The closure elements of such closure element arrangements may, for example, be doors, especially side doors, flaps, especially tailgates, trunk lids, bonnets, load space floors or similar of a motor vehicle. In this respect, the term "closure element" is widely understood in the present case. A drive arrangement is often associated with the closure element of the closure element arrangement, which allows the closure element to be opened and closed by a motor. In order to make the triggering of actuation of the closure element arrangement particularly comfortable for the operator, it is becoming increasingly common to sense a triggering operating situation. An example of this is provided by DE 10 2014 101 661 A1, which concerns a method for actuating a motorized tailgate arrangement of a motor vehicle.

SUMMARY

The known method from which the disclosure originates is aimed at detecting a predetermined foot movement of the operator. It enables the reduction of erroneous detection by detecting not only an operator's moving leg but also an operator's stationary leg. As a result, the detection of two body parts results in a particularly high overall reliability of detection.

With the known method, depending on the system design, there is a certain reaction time between the sensory detection of a triggering operating situation, here the detection of the operator's foot movement, and a motorized movement of the closure element. This often leads the operator to repeat the foot movement in question in order to ensure that the desired motorized displacement of the closure element is actually triggered. This is perceived by the operator as a loss of comfort.

The disclosure is based on the problem of designing and developing the known method so that the ease of use is increased.

The above problem is solved with a method as described herein.

The basic consideration is essentially to provide the operator with a haptic transducer by means of which the control arrangement can issue haptic information to the operator. This allows the operator to be provided with feedback on the state of the closure element arrangement without the operator having to read a display or similar.

In particular, it is proposed that a portable haptic transducer be provided, wherein in at least one predetermined trigger state of the control arrangement haptic information associated with the trigger state is output by means of the transducer. In principle, a plurality of trigger states may be provided for here, each of which results in the outputting of corresponding haptic information.

The haptic information can be output in a variety of ways. In some embodiments, the transducer produces a mechanical vibration for this, which is noticeable by the operator. Such a mechanical vibration can be generated with little constructive effort. Furthermore, it is easily possible to give different haptic information with a mechanical vibration. For example, the duration of the mechanical vibration can be changed depending on the information to be transmitted. It is also conceivable to produce a variable amplitude mechanical vibration, especially with increasing or decreasing amplitude, to output different information.

Various embodiments relate to variants for defining the triggering operating situation by means of operating situation conditions. In general, the point here is that the operator as such or a body part of an operator performs a predetermined movement in order to trigger actuation of the closure element arrangement. In the case of such a gesture-controlled solution, the proposed solution presents itself as particularly advantageous. The reason for this is that, unlike pressing a button or similar, a gesture-controlled operation basically contains no feedback about the actual control technology detection of the respective gesture.

In various embodiments, it is therefore provided that the predetermined trigger state consists of the fact that a triggering operating situation has actually been detected by means of the control arrangement. Thus, if the operator performs a gesture that is detected by the control arrangement as a triggering operating situation, haptic feedback is carried out by means of the transducer. This confirms to the operator that the gesture performed is registered and detected as a triggering operating situation. Thus, the operator knows that the control of the closure element that he wants can then be expected without further action on his part being needed.

In various embodiments, the predetermined trigger state consists of the fact that an operator that is approaching the motor vehicle has been detected by means of the control arrangement. This confirms to the operator that the control arrangement is awaiting further operator events.

The situation is similar with the various embodiments, in which not only the operator's approach to the vehicle, but also the position of the operator within a short-range area associated with the closure element is concerned. In the latter variant, it is confirmed to the operator that he is in a position that enables sensor detection of another operating event, in particular a movement of a body part of the operator.

However, the predetermined trigger state may also concern the closure state of the closure element arrangement. For example, this may involve motorized adjustable windows or a motor vehicle lock of the closure element arrangement. In some embodiments, it is confirmed to the operator that the closure element is in a fully closed or locked state by means of the haptic information output by the transducer.

The transducer can be any portable device that can be used to transmit haptic information. In some embodiments the portable device can include a radio telephone, an electronic bracelet, a smartwatch, a radio key, etc. The radio telephone can include a smartphone, which can be turned into a transducer according to the proposal by loading suitable application software into the memory of the smartphone.

For the establishment of a wireless, especially radio-based, communication path between the control arrangement on the one hand and the transducer on the other hand, a wireless, especially radio-based, communication interface is associated with each of said two components. Direct communication between the control arrangement on the one hand and the transducer on the other hand ensures that the appropriate haptic information by means of the transducer can be guaranteed after a reproducible reaction time.

According to a further concept, a control system for a motorized closure element arrangement of a motor vehicle is provided, which in particular serves the implementation of the above proposed method.

According to the further concept, it is essential that the control system has a control arrangement, a sensor arrangement and a portable haptic transducer that interact with each other. In this respect, everything described in relation to the proposed method may be referred to.

Various embodiments provide a method for actuating a motorized closure element arrangement of a motor vehicle, wherein the closure element arrangement comprises a closure element, a control arrangement and a sensor arrangement, wherein the sensor measurement values of the sensor arrangement are monitored by means of the control arrangement to determine whether a triggering operating situation exists that is defined by at least one operating situation condition and wherein actuation of the closure element arrangement is triggered on detecting the triggering operating situation by means of the control arrangement, wherein a portable haptic transducer is provided and in at least one predetermined trigger state of the control arrangement haptic information associated with the trigger state is output by means of the transducer.

In various embodiments, the transducer comprises an actuator for generating a mechanical vibration and in the predetermined trigger state the transducer produces a mechanical vibration to output haptic information, or that the transducer comprises an actuator for producing a mechanical impulse and in the predetermined trigger state the transducer produces a mechanical impulse to output the haptic information.

In various embodiments, the transducer outputs different haptic information depending on the type of the predetermined trigger state.

In various embodiments, an operating situation condition consists of the fact that a predetermined movement of an operator or a body part of an operator, in particular a leg or a hand, has been detected by the control arrangement, and/or an operating situation condition consists of the fact that an operator that is in a predetermined short-range area associated with the closure element has been detected by the control arrangement, such as over a predetermined minimum time interval.

In various embodiments, the predetermined trigger state consists of the fact that a triggering operating situation has been detected by means of the control arrangement, or the predetermined trigger state consists of the fact that an incomplete triggering operating situation has been detected by means of the control arrangement.

In various embodiments, the predetermined trigger state consists of the fact that an operator that is approaching the motor vehicle has been detected by means of the control arrangement, and/or that the predetermined trigger state consists of the fact that the control arrangement has been awakened from a standby mode by the approach of the operator.

In various embodiments, the predetermined trigger state consists of the fact that an operator that is moving into a predetermined short-range area associated with the closure element and/or that remains in the predetermined short-range area associated with the closure element, such as over a predetermined minimum time interval, has been detected by means of the control arrangement.

In various embodiments, the predetermined trigger state consists of the fact that the closure element arrangement adopts a predetermined closed state, such as the predetermined trigger state consists of the fact that at least one motorized displaceable window of the closure element arrangement is closed and/or open, and/or at least one motorized displaceable motor vehicle lock of the closure element arrangement is locked and/or unlocked.

In various embodiments, the predetermined trigger state consists of the fact that an error state occurs. In some embodiments, an error state consists of the fact that a predetermined closed state has not been adopted despite the otherwise actuation of the closure element.

In various embodiments, the transducer is embodied as a radio phone, in particular as a smartphone, as an electronic bracelet, as a smartwatch, as a radio key or similar, by means of which the haptic information is output.

In various embodiments, the control arrangement comprises a wireless communication interface and the transducer comprises a wireless communication interface and that in the predetermined trigger state an output command to output haptic information is transmitted to the transducer by means of the control arrangement via the two communication interfaces over a wireless, and especially a radio-based, communication path.

Various embodiments provide a control system for a motorized closure element arrangement of a motor vehicle, in particular for carrying out a method as described herein, with a control arrangement and with a sensor arrangement, wherein the sensor measurement values of the sensor arrangement are monitored by means of the control arrangement to determine whether a triggering operating situation caused by at least one operating situation condition exists and wherein the control arrangement triggers actuation of the closure element arrangement when the triggering operating situation is detected, wherein a portable haptic transducer is provided and that in at least one predetermined trigger state of the control arrangement haptic information associated with the trigger state is output by means of the transducer.

In various embodiments, the control arrangement comprises a wireless communication interface and the transducer comprises a wireless communication interface and in the predetermined trigger state the control arrangement transmits an output command to the transducer to output haptic information via the two communication interfaces via a wireless, especially radio-based communication path.

In various embodiments, the sensor arrangement and at least part of the control arrangement, such as the communication interface of the control arrangement, together form an autonomously operating unit with regard to the output of haptic information by means of the transducer.

BRIEF DESCRIPTION OF THE DRAWINGS

The disclosure is described below on the basis of a drawing that only shows one exemplary embodiment. In the figures.

DETAILED DESCRIPTION

Figure 1:
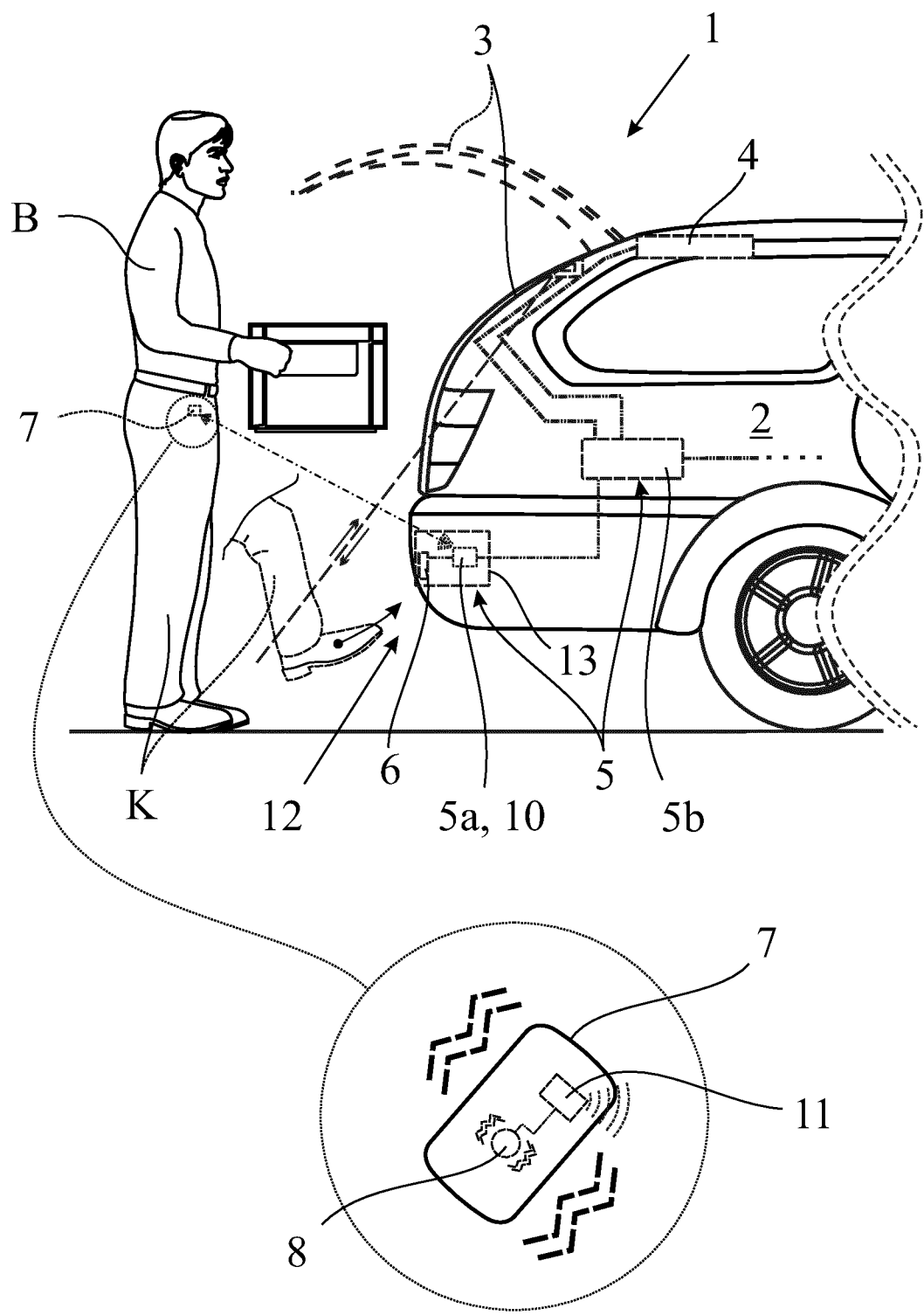
FIG. 1 shows the rear area of a motor vehicle with a motorized closure element arrangement and with a proposed control system associated with the closure element in a side view.

The method as disclosed in the proposal is used for the actuation of a motorized closure element arrangement 1 of a motor vehicle 2, which is equipped with a closure element 3, a drive arrangement 4 associated with the closure element 3, a control arrangement 5 and a sensor arrangement 6.

The closure element 3 can be all kinds of closure elements of a motor vehicle, as explained in the introductory part of the description. Here, the closure element 3 is the tailgate of a motor vehicle 2. Everything described in relation to a tailgate applies correspondingly to all other types of closure elements.

The term "actuation of the motorized closure element arrangement 1" means in a first design that in the event of actuation the closure element 3 is displaced by the drive arrangement 4. The actuation of the closure element arrangement 1 is therefore always connected with energization of a drive motor (not shown) of the drive arrangement 4. In particular, the closure element 3 of the closure element arrangement 1 is adjustable in whole or in part between a fully closed position (shown in FIG. 1 in a solid line) and a fully open position (shown in FIG. 1 in a dotted line) using the drive arrangement 4. In principle, it may also be provided that actuation of the motorized closure element arrangement 1 only causes pushing on the closure element 3, so that an engagement gap between the closure element 3 and the motor vehicle body is formed, in which the operator B can intervene and manually perform the further adjustment of the closure element 3.

In a second design, the term "control of the motorized closure element arrangement" means that in the event of actuation a motor vehicle lock associated with the closure element 1 and not shown here, in particular at least one motor vehicle lock, is displaced by a motor. The displacement of the motor vehicle lock system can be a motorized adjustment of the state of the lock, for example between the lock states "locked" and "unlocked", so that opening of the motor vehicle lock is possible depending on the state of the lock. It is also conceivable that the adjustment of the motor vehicle lock causes the opening of the motor vehicle lock, so that the associated closure element 3 is released in the opening direction. Finally, the displacement of the motor vehicle lock can be pressing upwards on the closure element 3 in the above sense.

The term "motorized" encompasses in the present case any adjustment with an actuator of any design, especially an electric actuator.

The sensor measurement values of the sensor arrangement 6 are monitored by means of the control arrangement 5 as to whether there is a triggering operating situation. The control arrangement 5 is therefore coupled to the sensor arrangement 6 for control purposes, so that the generation of corresponding sensor measurement values of the sensor arrangement 6 can be triggered by the control arrangement 5. Depending on the application, the sensor arrangement 6 can include distance sensors, imaging sensors or similar. Capacitive sensors have proven themselves as distance sensors. In this respect, reference may be made to the German application DE 10 2014 101 661 A1 of Nov. 2, 2014, which is associated with the applicant and which is made the subject-matter of the present application in that regard.

The sensor arrangement 6 can also include a radar sensor that makes it easy to detect the operator's body parts, including their orientation.

Finally, the sensor arrangement 6 can include a camera-based sensor as an imaging sensor. Here a 3D camera system can be used, which has at least two camera sensors that are spaced apart from each other.

As indicated above, the sensor arrangement 6 serves to monitor the sensor measurement values of the sensor arrangement 6 as to whether a triggering operating situation exists. As proposed, such an operating situation is defined by at least one operating situation condition. Such an operating situation condition can basically affect static parameters such as the current position, but also dynamic parameters such as the movement of at least one body part of the operator. On detecting an operating situation defined in this way, the control arrangement 5 triggers corresponding actuation of the closure element arrangement 1.

The detection of the above triggering operating situation can lead with a completely closed closure element 3 to the closure element 3 being displaced by means of the drive arrangement 4 in the opening direction, such as into the fully opened position. On the other hand, the detection of a triggering operating situation with a fully opened closure element 3 can lead to the closure element 3 being displaced by the drive arrangement 4 in the closing direction, such as into the fully closed position.

It is essential to the proposed solution that a portable haptic transducer 7 is provided, wherein in at least one predetermined trigger state of the control arrangement 5 haptic information associated with the trigger state is output by the transducer 7. There is a wireless communication path, in particular radio-based, between the control system 5 on the one hand and the transducer 7 on the other hand, as will be described.

FIG. 1 shows that the transducer 7 has an actuator 8 for generating mechanical vibration, wherein in the predetermined trigger state the transducer 7 produces a mechanical vibration to output the haptic information. The actuator 8 is designed in such a way that an operator carrying the transducer 7, for example in a jacket or trouser pocket, can clearly feel the mechanical vibration.

Alternatively, it may be provided that the transducer 7 comprises an actuator 8 for the generation of mechanical impulses, wherein in the predetermined trigger state the transducer 7 generates mechanical impulses for the output of haptic information. Here, too, the actuator 8 is designed in such a way that the mechanical impulses are clearly noticeable. Other variants for the design of the transducer 7 are conceivable.

It may be noted that the transducer 7 may also be designed to provide visible and/or audible information. This is especially at the same time as the proposed output of the haptic information in order to increase the probability that the operator B will also perceive the information.

In general, it may be proposed that the transducer 7 will output different haptic information depending on the type of the predetermined trigger state. The different haptic information can differ in amplitude, time duration or time profile.

Different variants are advantageous for the definition of the triggering operating situation by at least one operating situation condition. In some embodiments, an operating situation condition consists of the fact that a predetermined movement of an operator B or a body part K of an operator B, in particular a leg or a hand, was detected by means of the control arrangement 5. Here, an operating situation condition consists of an operator B's leg performing a back and forth movement, also known as "kicking movement". Such a kicking movement is indicated in FIG. 1. Alternatively, an operating situation condition may also consist of a predetermined movement of an operator B's hand having been detected by means of the control arrangement 5. More generally, operating situation conditions can include all kinds of gestures by an operator B.

Another operating situation condition consists of the fact that the control arrangement 5 was used to detect an operator B who was in a predetermined short-range area 9 associated with the closure element 3. In some embodiments, said operating situation condition is only met when the operator remains in the short-range area 9 for more than a predetermined minimum time interval, wherein the minimum time interval lies in a range between 2 s and 10 s.

Other operating conditions are conceivable. For example, the operating situation condition may also concern the orientation of at least one part of the body of the operator B or similar.

The above follows from the definition of the predetermined trigger state, which is intended to trigger the output of haptic information by the transducer 7. In this respect, the definition of the trigger state is of particular importance in the present case. Depending on the application, various advantageous variants are conceivable for this purpose.

In some embodiments, it is provided that the predetermined trigger state consists of the fact that a triggering operating situation has actually been detected by the control arrangement 5. In the exemplary embodiment represented in FIG. 1, this means that the detection of a kicking movement of the operator B's leg triggers the output of haptic information by means of the transducer 7. As a result, it is immediately confirmed to the operator B that his leg movement has been recognized as a triggering operating situation.

Conversely, however, it may also be provided that the predetermined trigger state consists only of the fact that an incomplete triggering operating situation has been detected by the control arrangement 5, which is assessed by the control arrangement 5 as a faulty detection and thus does not lead to actuation of the closure element arrangement 1. In this case, in FIG. 1 a partially performed kicking movement of the operator B's leg leads to a corresponding haptic error message via the signal generator 7.

It may also be advantageous that the detection of a triggering operating situation triggers the output of first haptic information by means of the transducer 7 and that the detection of an incomplete triggering operating situation triggers the output of second haptic information by means of the transducer 7. The first haptic information could be, for example, a small amplitude mechanical vibration, while the second haptic information is a mechanical vibration with a comparatively large amplitude.

However, the proposed output of haptic information by means of the transducer 7 can also be used to inform the operator B that the detection of operator events by the control arrangement 5 is possible at all. For this purpose, it can be provided that the predetermined trigger state consists of the fact that an operator B who is merely approaching the motor vehicle has been detected by the control arrangement 5. Alternatively or in addition, the trigger state can also be defined by the fact that the control arrangement 5 has already been awakened from a standby mode by the approach of the operator B. In order to detect the approach of the operator B, in some embodiments, it is not the sensor arrangement 6 that is used, but another sensor arrangement that is not shown here, which includes a long-range sensor. For example, such a long-range sensor determines the approach of the operator B on a radio basis.

Figure 2:
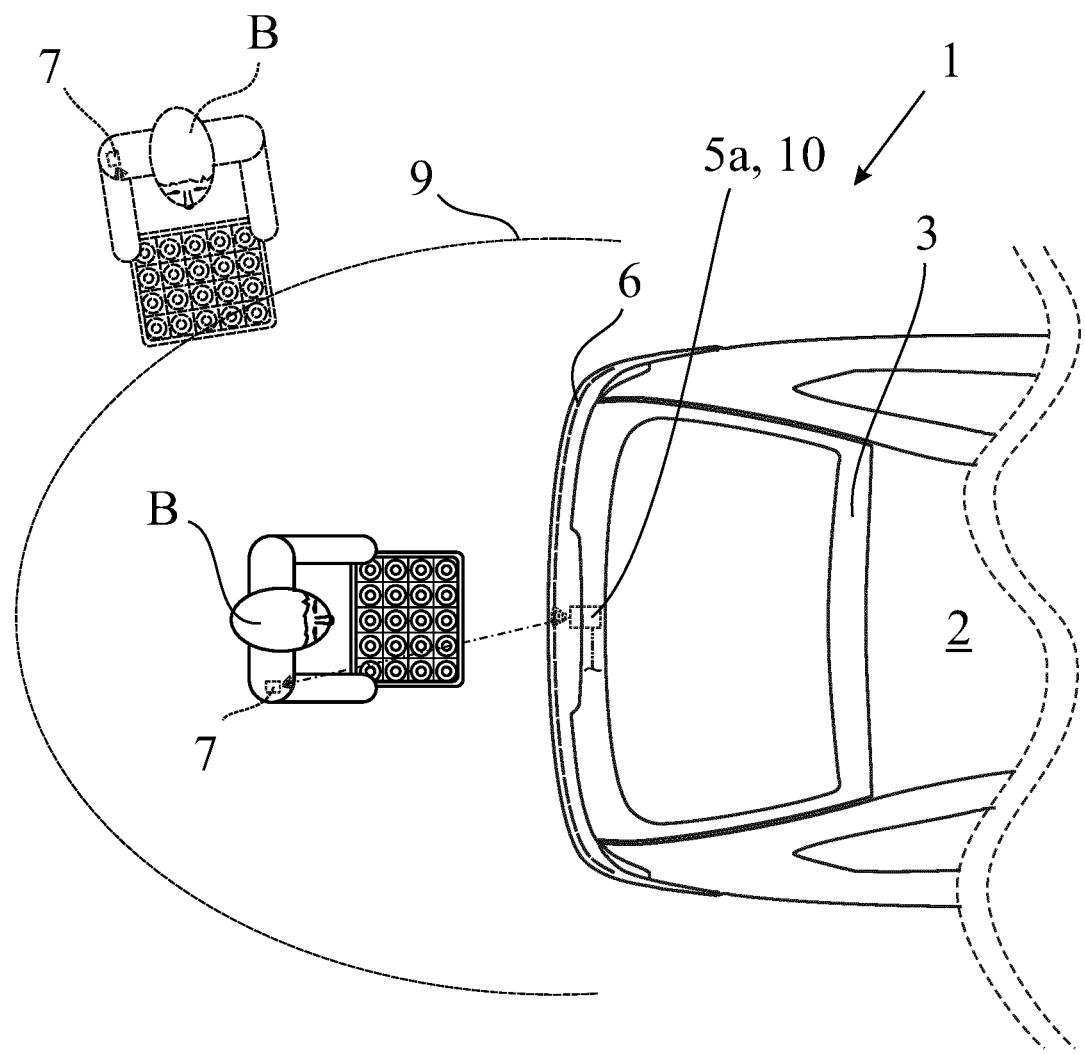
FIG. 2 shows the rear area of the motor vehicle according to FIG. 1 in a view from above.

In order to increase the likelihood of correct detection of a triggering operating situation, it can also provide that the predetermined trigger state consists of the fact that an operator B that is moving in a predetermined short-range area 9 associated with the closure element 3 has been detected by means of the control arrangement 5. Alternatively or additionally, it may be provided that the trigger state consists of the fact that an operator B that is located in a predetermined short-range area associated with the closure element 3 has been detected by means of the control arrangement 5, here over a predetermined minimum time interval. This means that in the situation shown in FIG. 2, a movement of the operator B into the short-range area 9 causes the output of haptic information by means of the transducer 7, thus informing the operator B that further operator events from him can now be detected reliably.

Alternatively, the predetermined trigger state may also consist of the fact that the closure element arrangement 1 adopts a predetermined closure state. For example, by issuing haptic information by means of the transducer 7, the operator B can be informed that the closure element arrangement 1 is in a fully closed or locked state. In detail, it may be provided in this sense that the predetermined trigger state consists of the fact at least one motorized adjustable window of the closure element arrangement 1 is closed, and/or that at least one motorized adjustable motor vehicle lock of the closure element arrangement 1 is locked. Conversely, the predetermined trigger state may also consist of the fact that at least one motorized adjustable window of the closure element arrangement 1 is open and/or that at least one motorized adjustable motor vehicle lock is unlocked.

In various embodiments, it may also be provided that the output of haptic information by means of the transducer 7 will be used to indicate an error state. Accordingly, the predetermined trigger state then consists of an error state occurring. Such an error state may, for example, consist of the fact a predetermined closure state has not been adopted despite the otherwise actuation of the closure element arrangement 1. By "otherwise actuation" is meant here that the closure element arrangement 1 has been actuated to set up the relevant closure state. The reason that the state in question has not yet been adopted may be, for example, a cable break, a mechanical jam, etc.

Numerous advantageous variants are conceivable for the design of the transducer 7. In principle, the transducer 7 can be a radio phone, especially a smart phone. It can be the case that the radio phone is converted into a proposed transducer 7 by suitably loading application software into the memory thereof. The transducer 7 can also be used as an electronic bracelet or as a smartwatch, each of which can include a radio-based communication interface. In principle, the transducer 7 can also be designed as a radio key of a motor vehicle, which can also include the radio-based authentication of the operator B in relation to an onboard vehicle control arrangement, in particular in relation to the control arrangement 5.

In some embodiments, an aforementioned wireless communication path between the control system 5 and the transducer 7 is provided. For this purpose, the control arrangement 5 comprises a wireless communication interface 10 and the transducer 7 comprises a wireless communication interface 11, wherein via the two communication interfaces 10, 11 an output command to output haptic information is transmitted to the transducer 7 via the resulting wireless communication path. The wireless communication path is here a radio-based communication path.

According to a further concept, which is of independent importance, a control system 12 is described for a motorized closure element arrangement 1 of a motor vehicle 2 as such, which is used in particular to carry out the aforementioned proposed method. In that regard, reference may be made to everything described in relation to the proposed method.

The proposed control system 12 comprises a control arrangement 5 as well as a sensor arrangement 6, wherein the sensor measurement values of the sensor arrangement 6 are monitored by the control arrangement 5 as to whether a triggering operating situation described above exists and wherein the control arrangement 5 triggers actuation of the closure element arrangement 1 when the triggering operating situation is detected. Moreover, the functioning of the control system 12 corresponds to the implementation of the above proposed method.

It is noteworthy with the design presented in the drawing, that the control arrangement 5 comprises two mutually separate controllers 5a, 5b, wherein the controller 5a is associated with the sensor arrangement 6 and the controller 5b is associated with the drive arrangement 4. The controller 5a associated with the sensor arrangement 6 is used to generate sensor measurement values by means of the sensor arrangement 6 and/or to analyze the sensor measurement values and/or to monitor the sensor measurement values with regard to whether a triggering operator situation exists. Here, the controller 5a associated with the control sensor arrangement 6 also comprises the aforementioned communication interface 10 of the control arrangement 5.

The controller 5b associated with the drive arrangement 4 is used to implement the actuation of the closure element 1 based on the commands received from the controller 5a. It should be noted that the controller 5a and the controller 5b can in principle be grouped together in a single controller.

FIG. 1 shows that part of the control arrangement 5, here the controller 5a associated with the sensor arrangement 6, together with the sensor arrangement 6, forms a preassembled unit 13. It is interesting in this case that here the communication interface 10 of the control arrangement 5 is part of the preassembled unit 13, so that in principle communications between the control arrangement 5 and the transducer 7 can already be tested in the assembled state.

The proposed solution can be easily implemented without having to intervene in the control structure of the motor vehicle. This can be achieved by the fact that the sensor arrangement 6 and at least part of the control arrangement 5, here at least the communication interface 10 of the control arrangement 5, form an autonomously operating unit together with regard to the output of haptic information by means of the transducer 7. The term "autonomously operating" means that the proposed output of haptic information can be provided without other control components of the motor vehicle being involved in the output of the haptic information. This applies in particular to the control components involved in authentication of the operator.

The proposed solution can therefore be integrated into an existing motor vehicle line, wherein changes are required only in the part of the control arrangement 5 associated with the sensor arrangement 6, here in the controller 5a. This leads to a generally cost-effective implementation of the proposed output of haptic information by means of the transducer 7.

Finally, it may be noted that an authentication routine can be provided that performs the aforementioned authentication of the operator in the sense of access control. The authentication routine can be undertaken by a parent vehicle controller. Particularly fast and constructively simple outputting of the proposed haptic information can be accomplished in some embodiments by the fact that outputting the haptic information is independent of the implementation of the authentication routine. This is appropriate, as outputting haptic information does not involve access to the motor vehicle. Outputting haptic information can be based solely on the occurrence of the trigger state.

REFERENCE NUMBER LIST 1 closure element arrangement
2 motor vehicle
3 closure element
4 drive arrangement
5 control arrangement
6 sensor arrangement
7 transducer
8 actuator
9 short-range area
10 communication interface
11 communication interface
12 control system
13 unit

The invention claimed is:

1. A method for actuating a motorized closure element arrangement of a motor vehicle, wherein the closure element arrangement comprises a closure element, a control arrangement and a sensor arrangement, wherein one or more sensor measurement values of the sensor arrangement are monitored by the control arrangement to determine whether a triggering operating situation exists that is defined by at least one operating situation condition and wherein actuation of the closure element arrangement is triggered on detecting the triggering operating situation by the control arrangement,
   wherein a portable haptic transducer configured as a cell phone is provided,
   wherein, in at least one predetermined trigger state of the control arrangement, the portable haptic transducer outputs a haptic information associated with the trigger state, and
   wherein the portable haptic transducer outputs different haptic information depending on the predetermined trigger state.

2. The method as claimed in claim 1, wherein the transducer comprises an actuator for generating a mechanical vibration and in the predetermined trigger state the transducer produces a mechanical vibration to output haptic information, or that the transducer comprises an actuator for producing a mechanical impulse and in the predetermined trigger state the transducer produces a mechanical impulse to output the haptic information.

3. The method as claimed in claim 1, wherein an operating situation condition exists when a predetermined movement of an operator or a body part of the operator has been detected by the control arrangement, or the operating situation condition exists when the operator is in a predetermined short-range area associated with the closure element has been detected by the control arrangement.

4. The method as claimed in claim 1, wherein the predetermined trigger state exists when a triggering operating situation has been detected by the control arrangement, or the predetermined trigger state exists when an incomplete triggering operating situation has been detected by the control arrangement.

5. The method as claimed in claim 1, wherein the predetermined trigger state exists when an operator that is approaching the motor vehicle has been detected by the control arrangement, or that the predetermined trigger state exists when the control arrangement has been awakened from a standby mode by an approach of the operator.

6. The method as claimed in claim 1, wherein the predetermined trigger state exists when an operator that is moving into a predetermined short-range area associated with the closure element or that remains in the predetermined short-range area associated with the closure element has been detected by the control arrangement.

7. The method as claimed in claim 1, wherein the predetermined trigger state exists when the closure element arrangement adopts a predetermined closed state or at least one motorized displaceable motor vehicle lock of the closure element arrangement is locked or unlocked.

8. The method as claimed in claim 1, wherein the predetermined trigger state exists when an error state has occurred.

9. The method as claimed in claim 1, wherein the control arrangement comprises a wireless communication interface and the transducer comprises a wireless communication interface and that in the predetermined trigger state an output command to output haptic information is transmitted to the transducer by the control arrangement via the two communication interfaces over a wireless communication path.

10. The method as claimed in claim 1, wherein an operating situation condition exists when a predetermined movement of an operator or a body part of the operator has been detected by the control arrangement, or the operating situation condition that exists when the operator that is in a predetermined short-range area associated with the closure element has been detected by the control arrangement over a predetermined minimum time interval.

11. The method as claimed in claim 1, wherein the predetermined trigger state exists when an operator that is moving into a predetermined short-range area associated with the closure element or that remains in the predetermined short-range area associated with the closure element, over a predetermined minimum time interval, has been detected by the control arrangement.

12. The method as claimed in claim 1, wherein the predetermined trigger state exists when the closure element arrangement adopts a predetermined closed state, wherein the predetermined trigger state exists when at least one motorized displaceable window of the closure element arrangement is closed or open, or at least one motorized displaceable motor vehicle lock of the closure element arrangement is locked and/or unlocked.

13. The method as claimed in claim 1, wherein the predetermined trigger state exists when an error state occurs, wherein the error state occurs when a predetermined closed state has not been adopted despite actuation of the closure element.

14. A control system for a motorized closure element arrangement of a motor vehicle, comprising:
a control arrangement and
a sensor arrangement, wherein one or more sensor measurement values of the sensor arrangement are monitored by the control arrangement to determine whether a triggering operating situation caused by at least one operating situation condition exists and wherein the control arrangement triggers actuation of the closure element arrangement when the triggering operating situation is detected,
wherein a portable haptic transducer configured as a cell phone is provided,
wherein in at least one predetermined trigger state of the control arrangement, the portable haptic transducer outputs a haptic information associated with the trigger state, and
wherein the portable haptic transducer outputs different haptic information depending on the predetermined trigger state.

15. The control system according to claim 14, wherein the control arrangement comprises a wireless communication interface and the transducer comprises a wireless communication interface and in the predetermined trigger state the control arrangement transmits an output command to the transducer to output haptic information via the two communication interfaces via a wireless communication path.

16. The control system according to claim 14, wherein the sensor arrangement and at least part of the control arrangement together form an autonomously operating unit with regard to the output of haptic information by the transducer.

17. The control system according to claim 14, wherein the sensor arrangement and the communication interface of the control arrangement, together form an autonomously operating unit with regard to the output of haptic information by the transducer.

* * * * *